Feb. 8, 1955   G. S. CARRICK   2,701,854
INDICATOR OR REGULATOR
Filed Aug. 23, 1950
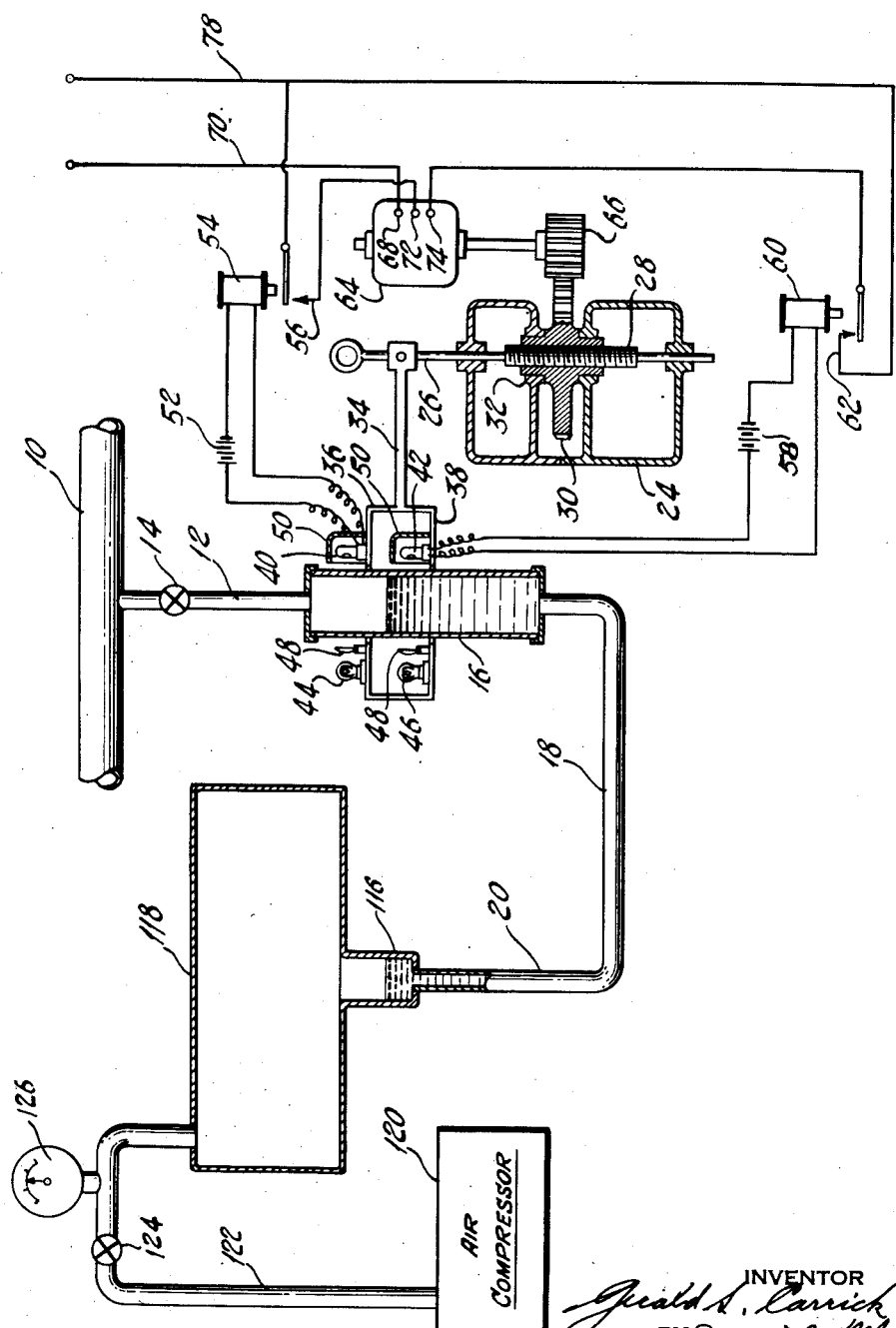
INVENTOR
Gerald S. Carrick
BY Daniel, Marble
his ATTORNEY United States Patent Office 2,701,854
Patented Feb. 8, 1955

2,701,854

INDICATOR OR REGULATOR

Gerald S. Carrick, Pleasantville, N. Y.

Application August 23, 1950, Serial No. 181,085

3 Claims. (Cl. 318—31)

This application is a division of my copending application, Serial 593,073 filed May 10, 1945, now Patent No. 2,555,674 granted June 5, 1951. The present invention relates to pressure responsive apparatus, and more particularly to pressure responsive regulators, especially those employing a column of liquid such as mercury, as an indicator of the variations in the pressure for which it is desired to provide the desired regulation.

Heretofore, regulators of such nature have employed floats responsive to variations in the level of a mercury column in a manometer. However, in such apparatus the float is apt to stick, thus resulting in improper regulation. In addition, in apparatus of the types heretofore employed the float is placed in the atmospheric leg of a manometer in order that the motion of the float may be transmitted to the exterior of the manometer without requiring stuffing boxes or the like. This means that in such construction the float must be located at a relatively high elevation in the plant. Moreover, inasmuch as it requires approximately two inches of mercury column to balance one pound of pressure, the atmospheric leg of a manometer must be unreasonably long if the pressure is high, as is the case in modern steam plants which employ steam pressures up to and above 2,000 pounds per square inch. Pressures of this order would require an atmospheric leg in a mercury manometer balancing the total pressure of over 300 feet in height.

In accordance with the present invention, which is intended primarily for use in regulating high pressures, I employ manometer means which is required to balance only a portion of the total pressure, the major portion of the pressure being balanced by a counterforce which preferably is in the form of a counter and substantially constant fluid pressure acting on the manometer in opposition to the pressure which is to be regulated. By balancing out the major portion of the total pressure to be regulated, so that the manometer is required to balance only the normal variations in the pressure required to actuate a regulating means, a very small and compact manometer may be employed.

I also employ in accordance with the invention electric switching means located adjacent to and outside either of the legs of a manometer, the switching means being responsive to the transmission of energy through the wall of the manometer tube, together with means for varying such transmission of energy in response to variations in the height of the liquid column in the leg. Inasmuch as no moving parts pass through or into the manometer tube, the electric switching means may be controlled by the level of the mercury or other liquid in the pressure leg of the manometer. Consequently, with such apparatus, and with the major part of the pressure constantly balanced out, the regulating apparatus may be located at any desired level in the plant together with other required regulating or control apparatus.

In a preferred embodiment of my invention the switching means comprises a pair of vertically spaced photoelectric cells on one side of a transparent manometer tube. Suitable light sources are arranged to direct beams of light through the tube to the cells, variations in liquid level thus serving to make and break the beams which in turn cause completion and interruption of electric circuits through the cells. The cells and preferably also the light sources are arranged to be moved vertically in response to activation of the cells so as to follow the changes in liquid level in order to prevent over-regulation and hunting. Also, in the preferred form of the invention the major portion of total pressure to be regulated is balanced by connecting what would otherwise be the atmospheric leg of the manometer to a confined body of elastic pressure fluid, such for example as air, the volume of which is sufficiently large in relation to the volume of mercury or other liquid employed in the manometer, so that the volume of the latter which is displaced by the fluctuations in pressure required to effect regulation, is negligible in comparison with the volume of the pressure fluid.

For an understanding of the more detailed nature of the invention, and the advantages to be derived from its use, reference may best be had to the ensuing portion of this specification taken in conjunction with the accompanying drawing which illustrates more or less diagrammatically by way of example but without limitation a suitable embodiment of apparatus for carrying the invention into effect.

Referring more particularly to the drawing, reference character 10 designates a conduit such as the steam header in a power plant, which carries fluid under pressure, the variations in which pressure are to be utilized for regulating purposes, for instance for regulating the rate of steam generation as by controlling the draft, the rate of fuel feed, or other factors, as is well known in power plant operation. Connected to the header 10 is a conduit 12, in which is preferably interposed a shut-off valve 14, and which leads to the upper end of a transparent, preferably cylindrical container 16, which in all respects may be similar to a gauge glass and will be referred to as such hereinafter. The conduit 18 communicates with the lower end of glass 16 and is U-shaped, having an upwardly extending portion 20. It will thus be seen that the gauge glass 16, together with the portion of the conduit 18 extending downwardly therefrom constitutes one leg of a manometer while the portion 20 of the conduit constitutes the other leg. Inasmuch as mercury is the heaviest substance which is liquid at normal temperature, it is preferably employed in the manometer. Also mercury is opaque, which is desirable, as will hereinafter appear. However, it is within the scope of my invention to employ other liquids, such as water.

Suitably mounted adjacent to the gauge glass 16 is a housing 24 within which is reciprocally mounted a rod 26. This rod preferably has a square or other noncircular cross-section so as to prevent rotation thereof in the housing. A portion of the rod is formed with an external screw thread 28 which engages a similar internal thread formed in the gear 30. This gear is rotatably mounted in the housing 24, by means of combined radial and thrust bearings 32. The rod 26 has rigidly attached thereto an arm 34 which is forked so as to provide an upper arm 36 and a lower arm 38. Both of these arms have arcuate portions which extend around the outside of the gauge glass 16 so that one end of the arcuate portion of each arm is diametrically opposite the other end with respect to the glass. A photo-electric cell 40 is suitably mounted on one end of the upper arm 36, while a similar cell 42 is mounted on the corresponding end of the lower arm 38. The opposite ends of these arms carry light sources 44 and 46, respectively, each of which may be provided with a suitable lens system as is diagrammatically indicated at 48, which serves to concentrate beams of light from the light sources, and to direct the beams through the gauge glass 16 towards the respective photo-electric cells. Each of the latter is preferably provided with a hood or the like 50, which serves to protect it from extraneous light, including light from the wrong light source. In other words, the cell 42 should not receive light from the source 44, nor from any other place than the source 46.

Photo-electric cell 40 is connected in series through suitable flexible leads to a battery 52 and the solenoid 54 of a relay having a normally closed contact 56. Photo-electric cell 42 is similarly connected through suitable flexible leads with the battery 58 and the solenoid 60 of a relay having a normally open contact 62. Obviously, both of the relay circuits could be connected in parallel to the same battery, or to any other suitable source of electric energy.

A reversible electric motor 64 carries a pinion 66 which meshes with the gear 30. This motor is provided with three terminals, of which terminal 68 is connected to the wire 70 of any suitable power circuits, while the terminals 72 and 74 are connected to the other wire 78 of the circuit through the contacts 56 and 62, respectively. As is well known, the internal connections of the motor are such that it will rotate in one direction when supplied with current through the terminals 68 and 72, and will run in the opposite direction when supplied with current through the terminals 68 and 74.

In order to balance the major portion of the pressure in conduit 10 the leg 20 is connected to the bottom of a pressure vessel 118 which may be provided with a bottom well 116 and which advantageously may be charged with air up to the desired pressure by means of an air compressor 120 through conduit 122 provided with a suitable shut-off valve 124 and pressure gauge 126.

The above described apparatus operates as follows:

The value of the pressure in conduit 10 to be regulated being known, the pressure vessel 118 is supplied from compressor 120 or other suitable source of pressure fluid so that the value of the pressure will substantially balance the pressure in conduit 10, or in any event, giving effect to the specific layout of the manometer, provide sufficient counter-pressure so as to bring the level of the mercury in the glass 16 to desired level, preferably about midway of the length of the glass.

With the parts in the position shown in this figure, the beam of light from the source 44 will pass through the transparent gauge glass 16 above the level of the mercury therein and will strike the photo-electric cell 40. The nature of this cell is such that, when subjected to light, it closes the electric circuit therethrough, thus energizing the solenoid 54 and maintaining the contact 56 open. On the other end, the light from the source 46 is interrupted by the mercury in the gauge glass and consequently no light strikes the photo-electric cell 42 and hence the solenoid 60 is not energized. As a result the contact 62 is open and the motor 64 is idle. Should the pressure in the header 10 increase, it will depress the level of the liquid in the gauge glass 16 until the level is below the beam of light from the source 46 and, hence, this beam will strike the cell 42, thus energizing the solenoid 60 and closing the contact 62. This connects the motor 64 to the power supply through the terminals 68 and 74, which causes the motor to rotate in the proper direction so as to move the rod 26 downwardly at a speed which is preferably greater than the speed at which the mercury level is depressed as a result of normal fluctuations of pressure.

Inasmuch as the light sources and the photo-electric cells are carried by the rod 26, they will move downwardly with it and the beam from the source 46 will be interrupted by the mercury in the gauge glass, thus opening the contact 62 and stopping the motor. If the device is employed as a regulator, the downward movement of rod 26, through suitable transmission means, has effected an adjustment of some member which tends to decrease the pressure in the line 10. If the regulation resulting from this downward movement of the rod 26 has been sufficient to arrest the increase in pressure, the level in the gauge glass does not decrease further and no further regulation takes place. However, if the pressure continues to increase, as soon as the mercury level falls below the beam from the source 46, contact 62 is again closed and the motor operates to further lower the rod 26 and hence to produce further regulation for decreasing the pressure. This step-by-step regulation continues until the increase in pressure is arrested. The advantage of the step-by-step movement is that it prevents over-regulation and hence hunting of the device.

In the event the pressure in the line 10 decreases, the mercury level in the gauge glass rises so as to interrupt the beam of light from the source 44, which in turn opens the circuit of the solenoid 54, thus permitting the contact 56 to close. Consequently, the motor 64 is connected through its terminals 68 and 72 and thus runs in the opposite direction from that previously described, so as to raise the rod 26. This in turn raises the light sources and the photo-electric cells until the beam from the source 44 strikes the cell 40, thus opening the contact 56 and stopping the motor. If necessary, this action is repeated, in the same manner as described in connection with the increase in pressure.

While movement of the mercury column due to fluctuation in pressure of the fluid in conduit 10 results in changing the volume of the pressure fluid trapped in vessel 118, the volume of such fluid, as previously noted, is made so great in comparison with the volume of mercury required to be displaced in order to actuate the regulating mechanism, that the pressure variation of the trapped body of fluid is so slight as to be negligible insofar as the efficacy of the regulating mechanism is concerned and may for all practical purposes be treated as constant.

It will be apparent that with apparatus as above described the same mechanism is suitable for use in regulating pressures within the whole range of pressures encountered in actual service, since the apparatus may be adapted to regulate pressures varying within any given range merely by suitably applying the appropriate pressure in the vessel 118 which is required to balance what may be termed the normal pressure, and with the manometer operating merely to balance and with its associated apparatus to control the fluctuations in pressure from the normal value.

Obviously, changes in the specific design and nature of the apparatus may be made without departing from the principles or scope of the invention which is to be considered as embracing all apparatus falling within the scope of the appended claims.

What is claimed:

1. In an automatic device operative by variations in fluid pressure, a manometer tube having substantially vertical legs connected together at their lower ends and partially filled with liquid so as to provide liquid columns in said legs, means for applying said pressure to the upper end of the column in one of said legs, a closed pressure chamber communicating with the upper end of the other leg and containing an elastic fluid under a predetermined superatmospheric pressure for maintaining a substantially constant superatmospheric pressure for balancing a constant part of the pressure applied to the first-mentioned leg, a pair of electric switching means spaced vertically outside one of said legs and responsive to variations in the transmission of energy through the wall of said one leg, means responsive to an increase in the level of the liquid in said one leg for varying the transmission of energy to the upper of said switching means and responsive to a decrease in said level for varying the transmission of energy to the lower of said switching means, a reversible electric motor connected to be operated in one direction under the control of one of said switching means and in the opposite direction under the control of the other switching means, and means driven by said motor for moving said switching means relative to said one leg in the same direction as the direction of movement of the liquid which resulted in the operation of the motor.

2. In an automatic device operated by variations in the pressure of a pressure fluid, a manometer in communication at one end with said pressure fluid, a pressure vessel providing a closed pressure chamber communicating with the other end of said manometer and containing an elastic fluid under a predetermined superatmospheric pressure for balancing a constant part of the pressure applied by said pressure fluid, the volume of said pressure chamber being many times the volume of the manometer liquid displaced by normal variations of the pressure of said fluid and the surface of contact between the elastic fluid and the manometer liquid being small in comparison with the transverse section of the pressure chamber, electrical means outside said manometer operative to sense variations in liquid level in the manometer, and means regulated by said electrical sensing means and operative to move the latter up and down with corresponding movement of the liquid level.

3. In an automatic device operated by variations in the pressure of a pressure fluid, a manometer having a liquid therein with the end of one leg of the manometer communicating with said pressure fluid, a pressure vessel providing a closed pressure chamber communicating with the end of the other leg of said manometer and containing a gas under a predetermined superatmospheric pressure for balancing a constant part of the pressure applied by said pressure fluid, the volume of said pressure chamber being many times the volume of the manometer liquid displaced by normal variations of the pressure of said fluid and the surface of contact between the gas and the manometer liquid being small in comparison with the transverse section of the pressure chamber, said other leg of the manometer having an enlarged portion at its upper end of substantially greater transverse section than the remainder of the manometer and being vertically disposed so that the liquid level in said leg remains therein throughout its normal range of movement, electrical means outside said manometer operative to sense variations in the liquid level in said one leg of the manometer, and means regulated by said electrical sensing means and operative to move the latter up and down with corresponding movement of said liquid level.

References Cited in the file of this patent

UNITED STATES PATENTS

| | | |
|---|---|---|
| 331,890 | Kelly | Dec. 8, 1885 |
| 337,910 | Wilcox | Mar. 16, 1886 |
| 640,303 | Leckbord | Jan. 2, 1900 |
| 1,961,879 | Harrison | June 5, 1934 |
| 1,970,871 | Tate | Aug. 21, 1934 |
| 2,059,152 | Smith | Oct. 27, 1936 |
| 2,172,095 | White | Sept. 5, 1939 |
| 2,341,177 | Cope | Feb. 8, 1944 |
| 2,362,446 | Bodine | Nov. 14, 1944 |
| 2,376,459 | Stephens | May 22, 1945 |
| 2,392,229 | Cohen | Jan. 1, 1946 |
| 2,436,350 | Bader | Feb. 17, 1948 |
| 2,591,197 | Rau | Apr. 1, 1952 |